United States Patent
Newlon et al.

(10) Patent No.: US 10,102,770 B2
(45) Date of Patent: Oct. 16, 2018

(54) METHOD AND MODEL FOR VISUAL DEMONSTRATION OF BACTERIA REMOVAL ON SIMULATED TONGUE MATERIAL

(71) Applicant: The Procter & Gamble Company, Cincinnati, OH (US)

(72) Inventors: Jason William Newlon, Lebanon, OH (US); Linda M. Bayuk, Cincinnati, OH (US); Melba Highley, Batavia, OH (US); Carrita Anne Hightower, Morrow, OH (US); Melissa Patterson, Mason, OH (US); Debra Kay Williams, Mason, OH (US)

(73) Assignee: The Procter & Gamble Company, Cincinnati, OH (US)

(*) Notice: Subject to any disclaimer, the term of this patent is extended or adjusted under 35 U.S.C. 154(b) by 169 days.

(21) Appl. No.: 15/186,896

(22) Filed: Jun. 20, 2016

(65) Prior Publication Data
US 2017/0365187 A1 Dec. 21, 2017

(51) Int. Cl.
G09B 23/28 (2006.01)
G09B 19/00 (2006.01)

(52) U.S. Cl.
CPC .................. G09B 19/0084 (2013.01)

(58) Field of Classification Search
USPC ....... 434/262, 263, 267, 272, 295, 296, 365, 434/366, 377
See application file for complete search history.

(56) References Cited

U.S. PATENT DOCUMENTS

| | | | | |
|---|---|---|---|---|
| 4,073,071 A | * | 2/1978 | Angelotti | G09B 23/283 434/185 |
| 6,296,490 B1 | * | 10/2001 | Bowden | G09B 23/288 434/265 |
| 6,524,390 B1 | | 2/2003 | Jones | |
| D637,646 S | * | 5/2011 | Malen | D19/62 |
| 2005/0136384 A1 | * | 6/2005 | Jarvis | G09B 19/0084 434/263 |
| 2014/0377194 A1 | * | 12/2014 | Strand | A61Q 11/00 424/57 |
| 2015/0079570 A1 | * | 3/2015 | Michiwaki | G09B 23/28 434/270 |
| 2017/0358248 A1 | * | 12/2017 | Podolsky | G09B 23/283 |

OTHER PUBLICATIONS https://web.archive.org/web/20160401012230/http://www.getpoochsmooch.com/—"Pooch_Smooch" Bad Breath Eliminator for Dogs dated Aug. 10, 2016.
https://web.archive.org/web/20160404190756/http://www.booninc.com/products/grass—Grass Boon dated Aug. 10, 2016.

* cited by examiner

*Primary Examiner* — Kurt Fernstrom
(74) *Attorney, Agent, or Firm* — Parker D. McCrary; Alexandra S. Anoff

(57) ABSTRACT

A method of demonstrating bacteria removal from the tongue, the method comprising: providing a simulated tongue substrate comprising a plurality of projections wherein the plurality of projections are arranged to simulate the surface of a human tongue; applying a film to the surface of the simulated tongue substrate; exposing the simulated tongue substrate to a liquid; agitating the simulated tongue substrate and the liquid to at least partially remove the film, wherein a liquid-film mixture is formed.

19 Claims, 4 Drawing Sheets

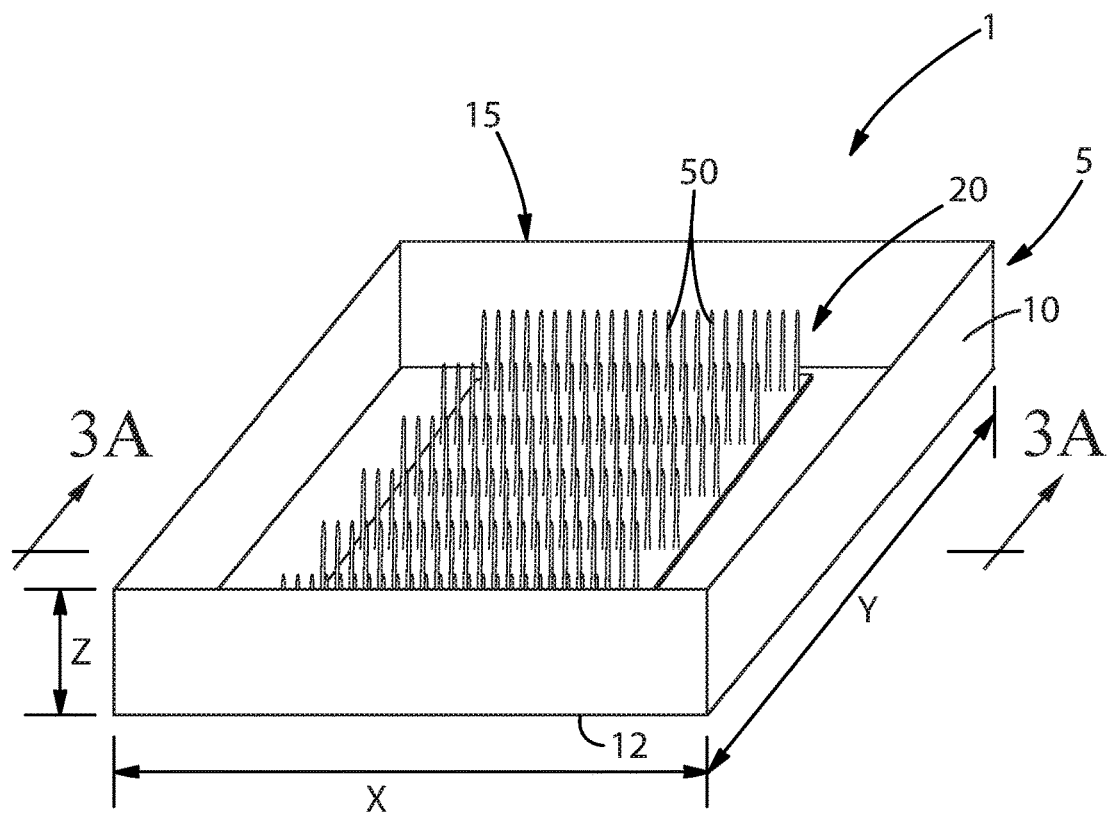
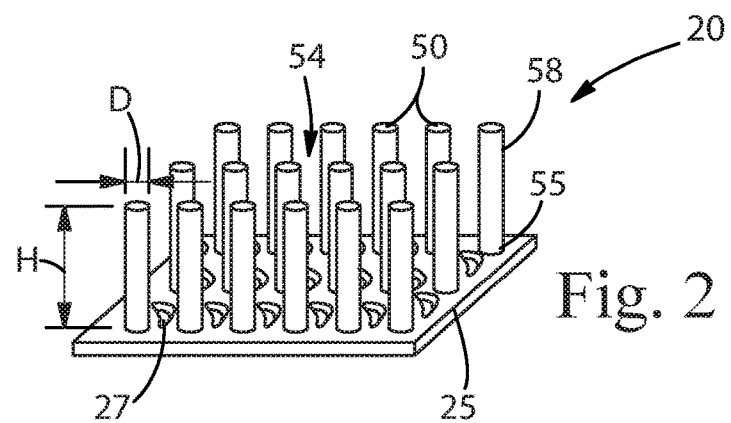

METHOD AND MODEL FOR VISUAL DEMONSTRATION OF BACTERIA REMOVAL ON SIMULATED TONGUE MATERIAL

FIELD OF THE INVENTION

The invention is generally directed to a method and model for providing a visual demonstration of bacteria removal on a simulated tongue material.

BACKGROUND OF THE INVENTION

Oral malodor, also referred to as halitosis or bad breath, is a common and undesirable condition for many people. A major source of bad breath in healthy people is the presence of anaerobic bacteria on the tongue. Such bacteria can accumulate between the papillae of the tongue's surface and can produce volatile sulfur compounds that can lead to bad breath.

A regimen of good oral hygiene often includes the removal of oral bacteria, as a means of controlling, if not eliminating, bacteria which causes bad breath. Oral care rinse products are developed with active ingredients that can kill and wash away the offending bacteria. However, consumers find it hard to understand the effectiveness of oral care rinse products because they cannot see the chemical removal of bacteria with the naked eye. It is challenging to communicate to consumers what happens at the microscopic level in the mouth in a way that is easy to visualize and understand.

As such, there remains a need for a physical representation of bacteria removal from the tongue to demonstrate the efficacy of oral care rinse products and encourage the use of such products.

SUMMARY OF THE INVENTION

A method of demonstrating oral bacteria removal, the method comprising: (a) providing a simulated tongue substrate comprising a plurality of projections wherein the plurality of projections are arranged to simulate the surface of a human tongue; (b) applying a film to the surface of the simulated tongue substrate; (c) exposing the simulated tongue substrate to a liquid; (d) agitating the simulated tongue substrate and the liquid to at least partially remove the film, wherein a liquid-film mixture is formed; (e) optionally recording the application and removal of the film from the surface of the simulated tongue substrate.

A model system for demonstrating oral bacteria removal comprising: (a) a simulated tongue substrate comprising a base and a plurality of projections wherein the plurality of projections simulate the papillae of a human tongue; (b) a film wherein the film comprises one or more bacteria simulating components; (c) an agitation device; and (d) a recording device.

A model for demonstrating oral bacteria removal comprising: (a) a simulated tongue substrate; and (b) a film comprising one or more bacteria simulating components; wherein the simulated tongue substrate comprises a base and a plurality of projections; wherein the plurality of projections are arranged to simulate the surface of a human tongue; wherein the film at least partially covers the plurality of projections; wherein the film is substantially removable in a liquid.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

FIG. 1 is an isometric view of a demonstration model;

FIG. 2 is an isometric view of a simulated tongue substrate;

DETAILED DESCRIPTION OF THE INVENTION

Figure 3A:
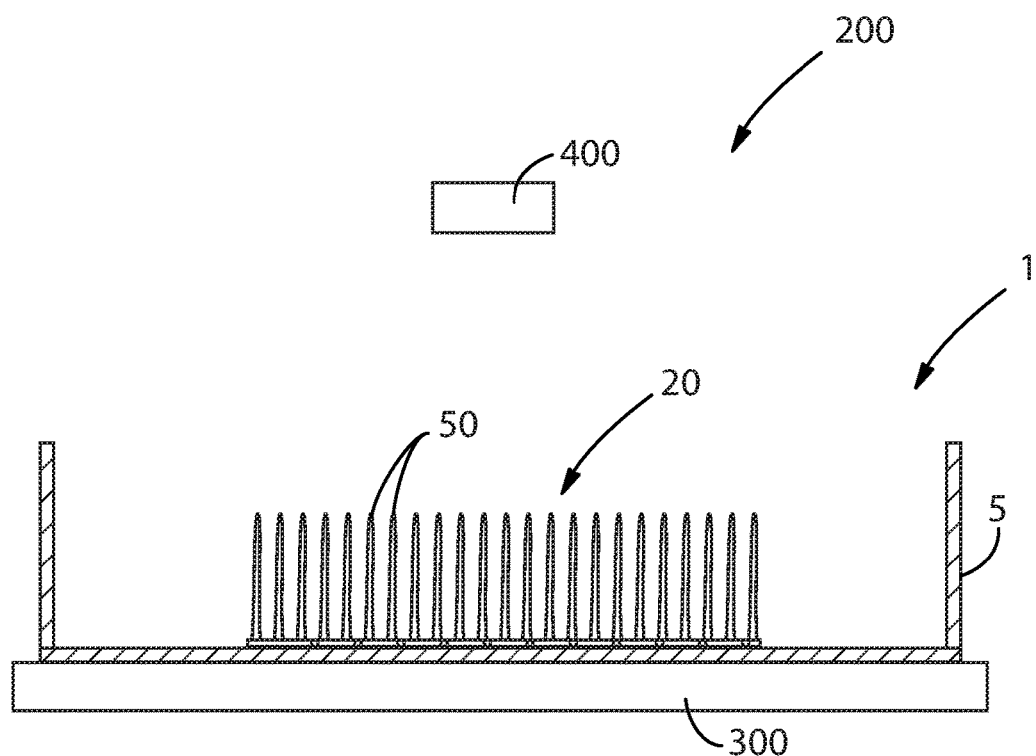
FIG. 3A is a cross-section view of the demonstration model of FIG. 1 taken along line 3A thereof as part of a demonstration model system having a mechanical agitator.

Tooth and tongue brushing often may not be sufficient to remove all bad breath bacteria which live in the nooks and crannies of the tongue's surface. Oral care rinse products can be effective in killing and/or washing away the offending bacteria left behind in places where brushing cannot reach. However, the effectiveness of current oral care rinse products can be hard for consumers to understand because the accumulation of bacteria on the tongue and subsequent removal by oral care rinse products is not visible to the naked eye.

Current demonstrations of bacteria removal from the mouth are designed to show bacteria growing in a Petri dish, which is not representative of how bacteria actually grow on the tongue. It is believed that a demonstration model which illustrates at a macro level how oral care rinse products can remove bacteria from the tongue's uneven surface is advantageous because it can allow for visualization of a microscopic problem and can allow consumers to better understand how the product works.

The present invention relates to a method and model for demonstration of bacteria removal from the human tongue. In one example, the demonstration model may be used as a visual aid to illustrate where bacteria live on the tongue and how the bacteria can be removed. The demonstration model can include a simulated tongue substrate having an irregular surface that simulates the surface of the human tongue. The irregular surface can be made of a plurality of projections that can represent the uneven surface of the tongue.

The demonstration model can also include a film having one or more bacteria simulating components. The film can be made out of a mixture of whip cream and starch-based packing peanuts shaved into small pieces. The film can represent bacteria and/or food particles found on the surface of the tongue. The film can be applied over the surface of the simulated tongue substrate to substantially cover a plurality of projections. The simulated tongue substrate can optionally be brushed to demonstrate how bacteria may be spread on the tongue with brushing and not completely removed.

The simulated tongue substrate can then be exposed to a liquid by partially submerging the simulated tongue substrate in a tray partially filled with water. The water can be colored blue to represent an oral care rinse product. The simulated tongue substrate can be held by a person's hand in the liquid and agitated in a back-and-forth motion to allow the liquid to flow between the projections. In addition, liquid can be splashed from the sides of the tray over the top of the simulated tongue substrate during agitation. The agitation can represent the movement of an oral care rinse product over the tongue during rinsing. The agitation can cause the film to be at least partially removed from the simulated tongue substrate and form a liquid-film mixture in the tray. A residual film may remain on the simulated tongue substrate. The residual film can represent bacteria that may be left on the tongue after rinsing with an oral care rinse product.

Demonstration models may be presented or shown to potential consumers, customers, dental practitioners, children, or other interested persons. Without being bound by theory, it is believed that use of the demonstration models described herein can be advantageous over use of, for example, models having bacteria grown on a smooth surface, because actual bacteria on the tongue live on an uneven surface and between the papillae. It is believed that allowing people to visualize the irregular surface of the tongue can help them understand how bacteria can live in the nooks and crannies of the tongue and escape mechanical removal by brushing. It is also believed that an understanding of the tongue's surface and the mechanism of bacterial removal can encourage people to purchase oral care rinse products and promote compliance with user regimens that include oral care rinse products.

In another aspect, the present invention is directed to a demonstration model system. In one example, a demonstration model system can include a simulated tongue substrate having a plurality of projections, a film, an agitation device and a camera.

A demonstration model system can be used as a visual aid to illustrate how oral care rinse products can remove bacteria from the tongue's surface. It is believed that one advantage to a demonstration model system is that the demonstration can be recorded and shown to potential consumers, customers, dental practitioners, children, or other interested persons at a later time, such as in a commercial or educational video.

In another aspect, the present invention is directed to a demonstration kit. In one example, the demonstration kit can include a tray, a simulated tongue substrate, a pre-measured amount of film, and a pre-measured amount of liquid. In one example, the demonstration kit can be used at schools to teach children about oral hygiene. In one example, the film and liquid are safe for use by children. In one example, the tray can be shaped like a portion of a jaw and have simulated teeth around the perimeter. In one example, the simulated tongue substrate can be shaped like a tongue. In one example, the film and liquid can change color when mixed together. For instance, the film can be yellow and the liquid can be blue, and when mixed together the color can change to green.

As used herein, the articles "a" and "an" when used in a claim, are understood to mean one or more of what is claimed or described.

As used herein, the terms "include," "includes," and "including," are meant to be non-limiting and are understood to mean "comprise," "comprises," and "comprising," respectively.

As used herein, "joined" means "permanently joined" or "releasably joined." The term "permanently joined" is understood to refer to configurations in which a first element is secured to a second element such that the elements generally cannot be separated from one another without at least partially destroying one or both of the elements. The term "releasably joined" is understood to refer to configurations in which a first element is secured to a second element, such that the first element and the second element can be separated with no or minimal damage to the first and second elements.

As used herein, "simulate the surface of a human tongue" means to imitate the appearance of the tongue. To simulate the surface of the tongue, it is not necessary for the plurality of projections to be shaped and/or organized to exactly mimic the surface of the human tongue. As used herein, "simulate the papillae of a human tongue" means to imitate the appearance of the papillae of the tongue. It is not necessary for the plurality of projections to be shaped and/or organized to exactly mimic the papillae of the human tongue.

As used herein, "visually perceptible" means that a human viewer can visually discern the projections with the unaided eye (excepting standard corrective lenses adapted to compensate for near-sightedness, farsightedness, or astigmatism, or other corrected vision) in lighting at least equal to the illumination of a standard 100 watt incandescent white light bulb at a distance of 1 meter.

As used herein, "visually record" means visual observation of the demonstration model using a camera or other visual recordation device. Using a camera or other visual recordation device may be performed in real time or captured via still or video photography for incorporation and replay in hardcopy or digital media.

FIG. 1 illustrates an example of demonstration model 1 of the present invention. In one example, demonstration model 1 can include more specifically, tray 5 and simulated tongue substrate 20 having a plurality of projections 50.

Tray 5 can include outer skirt 10 joined to bottom 12. In one example, tray 5 can include open-end 15 opposite bottom 12. In one example, outer skirt 10 and bottom 12 can be permanently joined. In one example, outer skirt 10 and bottom 12 can be releasably joined, such as in a snap-fit arrangement. In one example, outer skirt 10 and bottom 12 can be joined such that leakage will not occur at the joint when tray 5 is filled with a liquid. In one example, outer skirt 10 and bottom 12 can be formed as one piece.

Tray 5 can have length X, width Y, and height Z. In one example, X can be from about 10 inches (25.4 cm) to about 40 inches (101.6 cm), and in another example from about 18 inches (45.72 cm) to about 25 inches (63.5 cm). In one example, X can be about 24 inches (60.96 cm). In one example, Y can be from about 5 inches (12.7 cm) to about 30 inches (76.2 cm), and in another example from about 15 inches (38.1 cm) to about 20 inches (50.8 cm). In one example, Y can be about 17 inches (43.18 cm). In one example, Z can be of any dimension sufficient to retain liquid at rest or during agitation. In one example, Z can be greater than the height of the plurality of projections 50. In one example, Z can be approximately the same height as the plurality of projections 50. In one example, Z can be less than the height of the plurality of projections 50. In one example, Z can be about 1 inch (2.54 cm) to about 20 inches (50.8 cm), and in another example about 5 inches (12.7 cm) to about 10 inches (25.4 cm). In one example, Z can be about 7 inches (17.78 cm).

In one example, simulated tongue substrate 20 can fit inside tray 5. In one example, length X, width Y, and/or height Z of tray 5 can be greater than that of simulated tongue substrate 20. In one example, length X, width Y, and/or height Z of tray 5 can be about two times larger than that of simulated tongue substrate 20. In one example, length X, width Y, and/or height Z of tray 5 can be about three times larger than simulated tongue substrate 20. One advantage to tray 5 having a larger length, width, and/or height than simulated tongue substrate 20 is that it can allow simulated tongue substrate 20 to be at least partially submerged in a liquid and moved from side-to-side to simulate an oral care rinse product moving over the tongue during rinsing in the mouth.

Referring to FIG. 2, simulated tongue substrate 20 can include a plurality of projections 50 generally extending from base 25 and a plurality of valleys 54 therebetween. Base 25 can be any structure that generally connects the plurality of projections 50. In one example, base 25 can define a plurality of apertures 27. The plurality of apertures 27 can allow simulated tongue substrate 20 to be submerged in a liquid and can allow the liquid to flow between the plurality of projections 50 to simulate an oral care rinse product moving between the papillae of the tongue. In one example, base 25 can be solid. In one example, base 25 can be flexible. In another example, base 25 can be inflexible.

The plurality of projections 50 may be any structures that generally extend from base 25 and terminate at top 58. In one example, top 58 can be configured to be flat. In another example, top 58 can be configured to be rounded. In yet another example, top 58 can be configured to be pointed.

The plurality of projections 50 can be formed in a variety of different structures and sizes. Non-limiting examples of projection structures can include tines, ribs, domes, or any other shape that provides surface irregularities along base 25, and combinations thereof. In one example, the plurality of projections 50 can be any shape that simulates the uneven surface of the tongue. The plurality of projections 50 can provide simulated tongue substrate 20 with a topographically diverse surface that is not smooth.

In one example, as shown in FIG. 2, the plurality of projections 50 can be in the form of tines. Tines can be in the form of a variety of shapes including columnar, conical, cylindrical and combinations thereof. The plurality of projections 50 can be of any size so long as they are large enough to be visually perceptible and simulate the uneven surface of the tongue. In one example, the plurality of projections 50 can have a height (H) of about 0.5 inch (1.27 cm) to about 4 inches (10.16 cm). In another example, the plurality of projections 50 can have a height of about 1 inch (2.54 cm) to about 3 inches (7.62 cm), and in another example about 1.5 inches (3.81 cm) to about 2.5 inches (6.35 cm). In one example, the plurality of projections 50 can have a height of about 2.1 inches (5.33 cm). In one example, the plurality of projections 50 can have an aspect ratio of height to diameter (D) greater than about 0.5. In one example, the plurality of projections 50 can have an aspect ratio of height to diameter greater than about 1, in another example greater than about 2, in another example greater than about 3, and in another example greater than about 4. The diameter is determined at projection base 55, which is the location from which the projection extends from base 25. The height is measured orthogonal to the surface of base 25. In one example, the plurality of projections 50 can extend from base 25 at an angle of from about 30 to about 90 degrees.

In another example, the plurality of projections 50 can be in the form of ribs. Ribs can be elongated elevated portions with intermittently disposed elongated recessed portions that are depressed relative to the elevated portions. Ribs can be formed in a simulated tongue substrate, for example, by etching a plurality of adjacent grooves in the substrate, by molding the substrate to leave behind a plurality of adjacent grooves, or by molding the substrate to leave behind a plurality of adjacent ridges. Ribs can have any desired cross sectional shape including straight edged and rounded. In one example, ribs can be curved along their length.

In another example, the plurality of projections 50 can be in the form of domes. Domes can be generally two-dimensional symmetric features that are elevated or depressed relative to adjacent portions. In one example, domes can be elevated portions or depressed portions having a shape of a portion of a hemisphere. In one example, domes can be elevated portions or depressed portions having a shape of a cylinder having a height less than half the diameter.

In one example, simulated tongue substrate 20 can have about 5 to about 15 projections per square inch (about 0.775 to about 2.32 per square cm) of base 25. In one example, simulated tongue substrate 20 can have about 7 to about 12 projections per square inch (about 1.08 to about 1.86 per square cm), and in another example about 8 to about 10 projections per square inch (about 1.24 to about 1.55 per square cm). In one example, simulated tongue substrate 20 can have about 9 projections per square inch (about 1.39 per square cm). The number of projections per square inch of the base should be enough to create an uneven surface, but not so many that the projections would be tightly packed and the base would not be visible. In one example, the base can be visible in between the projections to replicate the nooks and crannies of the tongue.

In one example, the plurality of projections 50 can simulate the irregular surface of the tongue. In one example, the plurality of projections 50 can be organized to replicate the papillary structure of the tongue. In one example, the plurality of projections 50 can be arranged in rows. In one example, the plurality of projections 50 can be arranged randomly and does not mimic the organization of papillae on the human tongue. In one example, the plurality of projections 50 can be arranged in clusters. Without being bound by theory, it is believed that the projections can act as a visual aid to illustrate the uneven surface of the tongue.

FIGS. 3A-7 illustrate demonstration model system 200. Demonstration model system 200 can include demonstration model 1, having tray 5 and simulated tongue substrate 20, agitation device 300 and recording device 400.

Figure 3B:
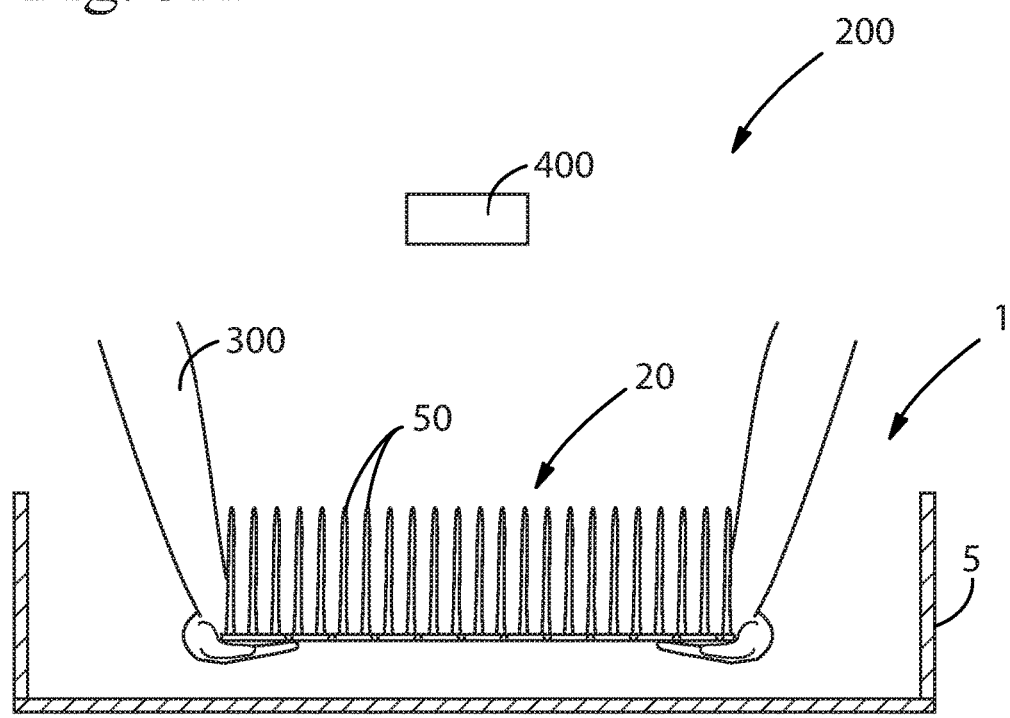
FIG. 3B is a variation of the demonstration model system of FIG. 3A having a hand agitator.

FIGS. 3A and 3B illustrate a clean demonstration model 1 before any film is applied to simulated tongue substrate 20. As shown in FIG. 3A, in one example, agitation device 300 can be a mechanical agitator. Non-limiting examples of mechanical agitators can include an oscillating shaker, orbital shaker, reciprocating shaker, rocking shaker and the like. In one example, as shown in FIG. 3B, agitation device 300 can be a human hand. A human can hold simulated tongue substrate 20 with one hand or with two hands. A human's hands can move simulated tongue substrate 20 in any direction that can cause a liquid to flow between the plurality of projections 50. Non-limiting examples of movement of the simulated tongue substrate can include up and down, side-to-side, circular, tilting, and combinations thereof. In one example, simulated tongue substrate 20 can be positioned such that agitation device 300 cannot be seen in the observation frame of recording device 400. In one example, simulated tongue substrate 20 can be held such that a person's hands cannot be seen in the observation frame of recording device 400.

In one example, recording device 400 can be positioned above demonstration model 1 such that recording device 400 can visually record simulated tongue substrate 20. In one example, recording device 400 can be arranged to stay stationary relative to the movement of simulated tongue substrate 20. Still photographs and video sequences can be acquired pre- and/or post-film application and pre- and/or post-liquid application to aid in communicating concepts associated with the structure of the tongue's surface, the growth of bacteria on the tongue, and the removal of bacteria from the tongue. Multiple recording devices may be utilized at various angles and various times to capture additional visual perspectives.

Recording device 400 can be any suitable camera or other optical picture-capturing device that can capture images or recordings of, including but not limited to, the demonstration model, the application of the film, and the removal of the film. Non-limiting examples of cameras can include digital cameras incorporated in a cellular device or tablet, digital single-lens reflex ("DSLR") cameras with a resolution of 7 megapixels or greater, such as a Canon EOS Rebel T5 EF-S or Nikon D3300, and video cameras such as a Canon XF305.

One example of the many suitable photographic configurations involves a digital camera incorporated in a tablet held or mounted directly above the surface of the demonstration model 1, utilizing lighting directed from the camera or from the same angle as the camera, capturing still images or video at 30 frames per second for up to about 10 minutes. In one example, magnification and camera proximity may be chosen such that the observation frame includes at least part of the simulated tongue substrate and the surface irregularities are visually perceptible. In one example, image or video acquisition can be initiated at or just prior to application of a film. In one example, image or video acquisition can be initiated at or just prior to application of a liquid and agitation of demonstration model 1.

Figure 4:
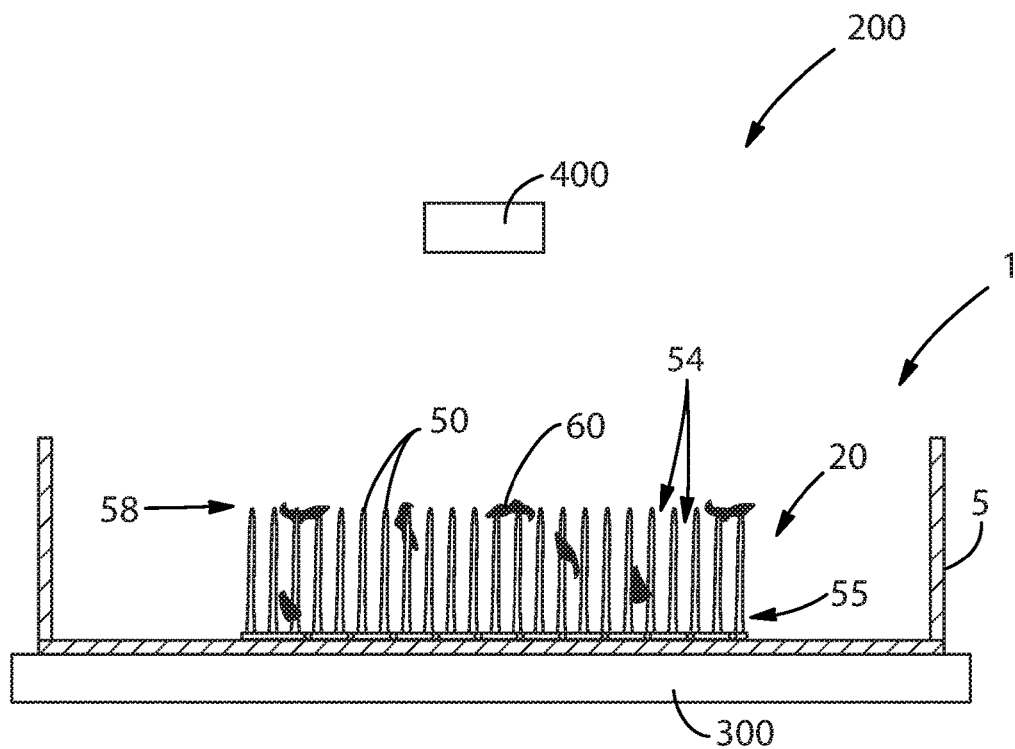
FIG. 4 is a variation of the demonstration model system of FIG. 3A showing a film on the simulated tongue substrate.

FIG. 4 illustrates demonstration model system 200 having film 60 applied to simulated tongue substrate 20. In one example, film 60 can at least partially cover simulated tongue substrate 20. In one example, film 60 can at least partially cover a plurality of projections 50 and a plurality of valleys 54. In one example, film 60 can cover top 58 of a plurality of projections 50, projection base 55 of a plurality of projections 50, from top 58 to projection base 55 of a plurality of projections 50, and combination thereof.

Figure 5:
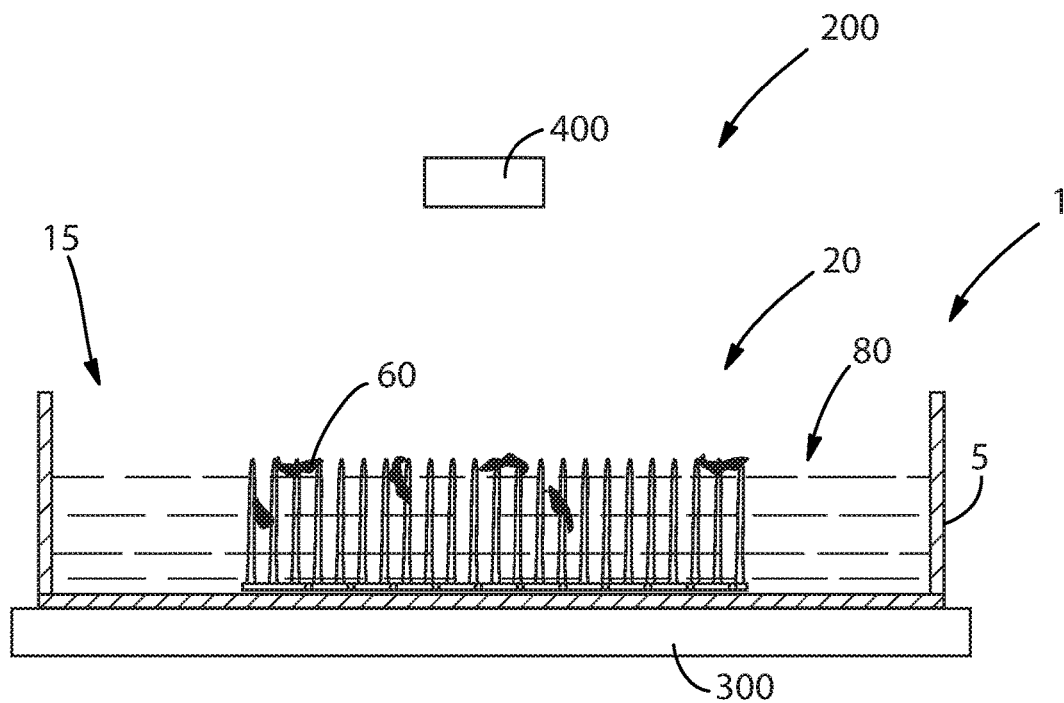
FIG. 5 is a variation of the demonstration model system of FIG. 3A showing the simulated tongue substrate exposed to a liquid.

FIG. 5 illustrates demonstration model system 200 having film 60 at least partially covering simulated tongue substrate 20 after liquid 80 is added to tray 5. In one example, liquid 80 can be poured into tray 5 through open-end 15. In one example, liquid 80 can be added to tray 5 through a port in tray 5. In one example, liquid 80 can at least partially fill tray 5. In one example, from about 80 mL to about 300 L of liquid 80 can be added to tray 5. In one example, from about 150 mL to about 200 L of liquid 80 can be added to tray 5, in another example from about 300 mL to about 100 L, and in another example from about 600 mL to about 50 L.

In one example, simulated tongue substrate 20 can be partially submerged in liquid 80 and surrounding liquid can be splashed over the top of simulated tongue substrate 20. In one example, liquid 80 can be sprayed over the top of simulated tongue substrate 20.

In one example, simulated tongue substrate 20 can be held in liquid 80 in tray 5 such that liquid 80 at least partially covers the projection height. In one example, the entire height of the projection may not be covered by liquid 80 because it could make visual perception of the projection more difficult. In one example, liquid 80 can cover about 20% of the projection height, in another example about 50%, in another example about 75%, and in another example about 95%.

Figure 6:
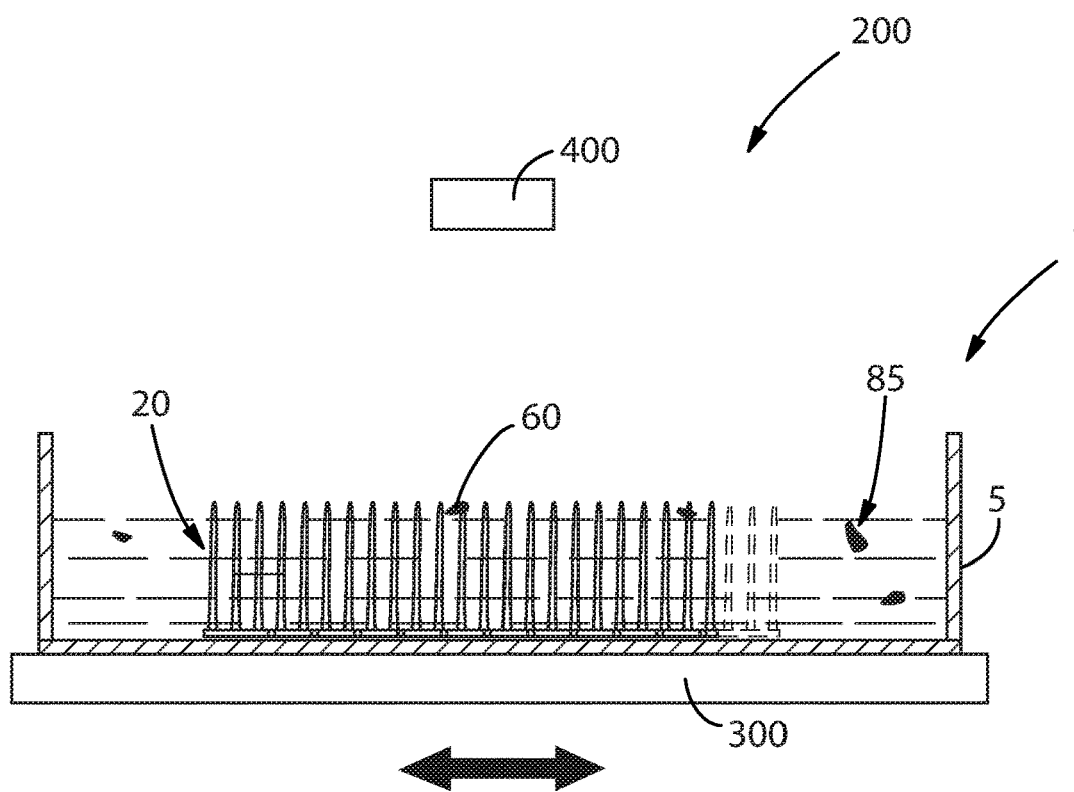
FIG. 6 is a variation of the demonstration model system of FIG. 3A showing film removal from the simulated tongue substrate after agitation and formation of a liquid-film mixture.

FIG. 6 illustrates demonstration model system 200 after agitation by agitation device 300. Agitation can cause film 60 to be substantially removed from simulated tongue substrate 20 and form liquid-film mixture 85. Liquid-film mixture 85 can simulate an oral care rinse product that has rinsed off bacteria from the tongue before expectoration.

Figure 7:
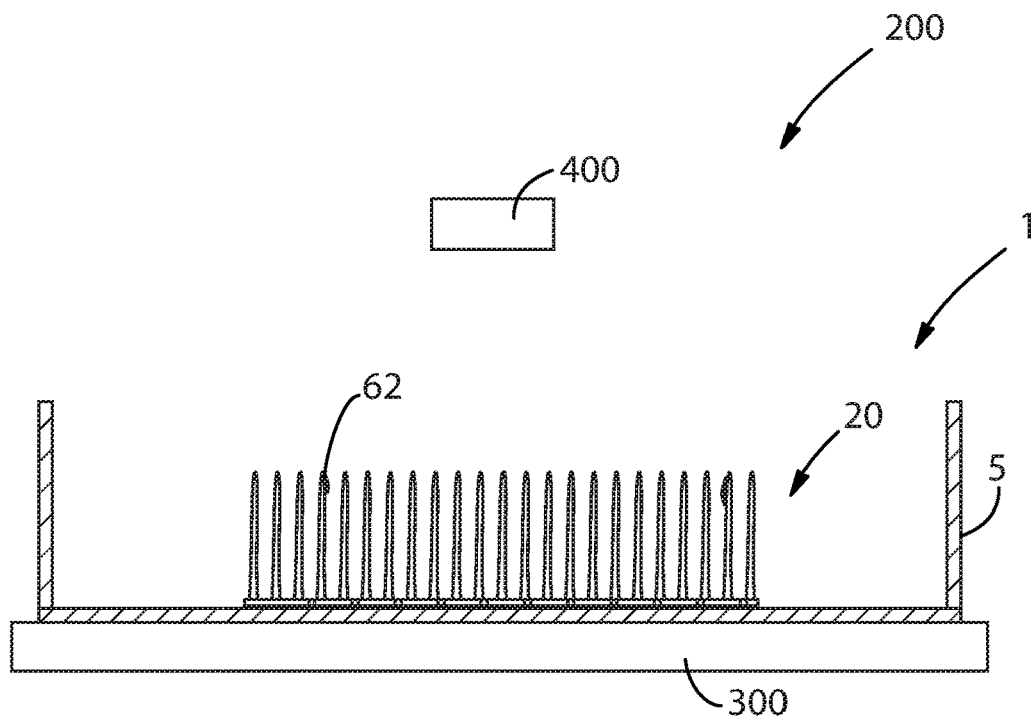
FIG. 7 is a variation of the demonstration model system of FIG. 3A showing a residual film on the simulated tongue substrate.

FIG. 7 illustrates demonstration model system 200 after liquid-film mixture 85 is removed from demonstration model 1. In one example, residual film 62 can remain on simulated tongue substrate 20 after agitation. In one example, the amount of residual film 62 left on simulated tongue substrate 20 after agitation can be less than the amount of film 60 originally applied. Residual film 62 can simulate the bacteria that can be left behind after rinsing with an oral care rinse product.

Tray

In one example, the tray can be configured to hold the simulated tongue substrate. In one example, the simulated tongue substrate can be removed from the tray. One advantage to such a configuration is that it can allow for easy cleaning and removal of liquid. In one example, the simulated tongue substrate is not removable from the tray.

In one example, the tray can include a port to allow liquid to enter and/or exit the demonstration model. In one example, the port can be disposed on the outer skirt of the tray. In one example, the port can be disposed on the bottom of the tray.

The tray can be made of any material that can retain liquid. Non-limiting examples of suitable materials can include plastic, steel, wood, glass and combinations thereof. Preferably, the materials are hard plastics such as polycarbonate, polyethylene, polypropylene, polyvinylchloride, polyethylene terephthalate, or the like.

Simulated Tongue Substrate

The simulated tongue substrate can be of any dimension so long as the plurality of projections are visually perceptible and the simulated tongue substrate fits within the tray. In one example, the simulated tongue substrate can have a length of about 3 inches (7.62 cm) to about 25 inches (63.5 cm), in another example from about 8 inches (20.32 cm) to about 20 inches (50.8 cm), and in another example from about 10 inches (25.4 cm) to about 18 inches (45.72 cm). In one example, the simulated tongue substrate can have a length of about 13 inches (33.02 cm). In one example, the simulated tongue substrate can have a width of from about 3 inches (7.62 cm) to 20 inches (50.8 cm), in another example from about 8 inches (20.32 cm) to about 18 inches (45.72 cm), and in another example from about 10 inches (25.4 cm) to about 15 inches (38.1 cm). In one example, the simulated tongue substrate can have a width of about 10.5 inches (26.67 cm).

In one example, the simulated tongue substrate can have an area of about 5 to about 500 in$^2$ (about 32.58 to about 3225.8 cm$^2$). In one example, the simulated tongue substrate can have an area of about 50 to about 400 in$^2$ (about 322.58 to about 2580.64 cm$^2$), in another example about 75 to about 300 in$^2$ (about 483.87 to about 1935.48 cm$^2$), and in another example about 100 to about 200 in$^2$ (about 645.16 to about 1290.32 cm$^2$). In one example, the simulated tongue substrate can have an area of about 136.5 in$^2$ (880.64 cm$^2$).

The simulated tongue substrate can be made out of any material which can be molded or shaped to simulate the microscopic projections and crevices found on the surface of the tongue. In one example, the simulated tongue substrate can be made of a material that can hold its shape when exposed to a liquid. In one example, the simulated tongue substrate can be made of a flexible material. In one example, the simulated tongue substrate can be made of an inflexible material. In one example, the simulated tongue substrate can be made out of both flexible and inflexible material, such as flexible projections and inflexible base. In one example, the simulated tongue substrate is re-usable. Non-limiting examples of suitable material to make the simulated tongue substrate can include glass, wood, metal, synthetic fibers such as polyester, acrylic and polyolefin, polymers, and combinations thereof. In one example, the simulated tongue substrate comprises a polymer selected from the group consisting of nylon, polycarbonate, polyethylene terephlalate, polystyrene, polyethylene, polyvinylchloride, acrylonitrile butadiene styrene, polypropylene, and combinations thereof.

In one example, the simulated tongue substrate can be pink in color to simulate human tissue.

Film

The film can comprise one or more bacteria simulating components. In one example, the one or more bacteria simulating components can be made of any suitable material so long as it can temporarily adhere to the simulated tongue substrate but can easily be removed with a liquid. Suitable material can include, but is not limited to, whipped cream, whipped icing, whipped cream cheese, yogurt, shaving cream, polystyrene-based packing peanuts, starch-based packing peanuts, foams, gels, powders and combinations thereof. In one example, the packing peanuts can be white in color. In one example, the packing peanuts can be colored. In one example, the packing peanuts cannot be colored because colored packing peanuts may not dissolve in water. In one example, the film can comprise a mixture of whipped cream and starch-based packing peanuts. In one example, the starch-based packing peanuts can be shaved or broken into small pieces.

In one example, the film can comprise one or more bacteria simulating components that are soluble in water. In one example, the film can comprise one or more bacteria simulating components that are not soluble in water. In one example, the film can comprise a mixture of soluble and insoluble bacteria simulating components. One advantage to having a film comprising soluble and insoluble components is that, after addition of a liquid and agitation, the soluble components can dissolve in the liquid and the insoluble components can remain suspended in the liquid. It is believed that such a mixture of soluble and insoluble components can simulate how bacteria on the tongue can be removed and/or killed by an oral care rinse product at different rates.

In one example, the film can comprise one or more bacteria simulating components that can dissolve in liquid in about 10 to about 90 seconds. In one example, one or more bacteria simulating components can dissolve in liquid in about 20 to about 60 seconds, and in another example in about 30 to about 45 seconds.

In one example, the film can have a viscosity from about 1 cP to about 1500 cP, in another example from about 20 cP to about 1000 cP, in another example from about 40 cP to about 800 cP, in another example from about 60 cP to about 400 cP, and in another example from about 80 cP to about 200 cP.

In one example, the film can be applied to surface of the simulated tongue substrate by any suitable method. In one example, the film can be brushed and/or spread on the surface of the simulated tongue substrate. In another example, the film can be sprayed on the simulated tongue substrate. In yet another example, the film can be poured on the surface of the simulated tongue substrate.

Any amount of film can be applied to the simulated tongue substrate so long as the surface of the simulated tongue substrate is at least partially covered with film and the amount of film is visually perceptible. In one example, the film at least partially covers all of the projections. In one example, the film substantially covers all of the projections. In one example, the film at least partially covers at least about 10% of the total number of projections. In one example, the film at least partially covers at least about 25% of the total number of projections, in another example at least about 50%, in another example at least about 75%, and in another example at least about 90%.

In one example, about 1 to about 25 ounces of the film can be applied to the surface of the simulated tongue substrate. In one example, about 3 to about 20 ounces of the film can be applied to the surface of the simulated tongue substrate, in another example about 5 to about 18 ounces, and in another example about 8 to about 16 ounces. In one example, about 16 ounces of the film can be applied to the surface of the simulated tongue substrate. In one example, about 8 ounces of the film can be applied to the surface of the simulated tongue substrate.

In one example, about 1 to about 500 grams of the film can be applied to the surface of the simulated tongue substrate. In one example, about 20 to about 300 grams of the film can be applied to the surface of the simulated tongue substrate, in another example about 50 to about 250 grams, and in another example about 100 to about 200 grams.

In one example, the film can be white and can simulate the bacteria film found on the tongue. In one example, the film can include a coloring agent. In one example, the film and the simulated tongue substrate can be contrasting colors. One advantage to the film and the simulated tongue substrate having contrasting colors is that the colors can make the film easier to see after it is applied to the simulated tongue substrate.

Liquid

In one example, the simulated tongue substrate can be exposed to a liquid. The simulated tongue substrate can be exposed to a liquid, for example, by pouring the liquid over the simulated tongue substrate, by splashing water over the simulated tongue substrate, by partially submerging the simulated tongue substrate in the liquid, and combinations thereof.

In one example, the liquid can simulate an oral care rinse product. In one example, the liquid can be any liquid composition that can dissolve, disperse and/or substantially remove the film from the simulated tongue substrate. In one example, the liquid can be water. In one example, the liquid can be an aqueous solution. In one example, the liquid can include active ingredients and/or excipients suitable for an oral care rinse product. In one example, the liquid can be an oral care rinse product.

In one example, the liquid can include a coloring agent. In one example, the liquid can be any color that is easy to see when the liquid is added to the simulated tongue substrate. In one example, the liquid and the simulated tongue substrate can be contrasting colors. In one example, the liquid can be blue. It is beneficial to add coloring agents to the liquid because it can simulate oral care rinse products and can make the liquid easier to see after it is added to the simulated tongue substrate.

In one example, the liquid-film mixture can be removed from the demonstration model. The liquid-film mixture can be removed, for example, by draining through the base of the simulated tongue substrate and into the tray, by draining through the bottom of the tray, pouring out the open-end of the tray, by opening a port in the tray, and combinations thereof.

Method

In another aspect, the present invention is directed to a method of visual demonstration of bacteria removal on a simulated tongue substrate. A method of demonstrating oral bacteria removal from the tongue can comprise the steps of:

(a) providing a simulated tongue substrate comprising a plurality of projections wherein the plurality of projections are arranged to simulate the surface of a human tongue;
(b) applying a film to the simulated tongue substrate;
(c) optionally brushing the simulated tongue substrate;
(d) exposing the simulated tongue substrate to a liquid;
(e) agitating the simulated tongue substrate and the liquid to at least partially remove the film, wherein a liquid-film mixture is formed;
(f) optionally removing the liquid-film mixture from the simulated tongue substrate; and
(g) optionally observing and/or recording the application and removal of the film from the surface of the simulated tongue substrate.

In one example, the method may optionally comprise the step of brushing the simulated tongue substrate after applying a film. A brushing step can demonstrate how bacteria on the tongue can be spread by brushing and may not be completely removed. Brushing can be performed with any suitable brushing device that resembles a tooth brush, such as a short bristle scrub brush with a handle. In one example, the brushing step can last for about 5 seconds to about 45 seconds, in another example for about 10 seconds to about 30 seconds, and in another example for about 15 seconds to about 20 seconds.

In one example, the simulated tongue substrate and the liquid can be agitated to remove the film from the simulated tongue substrate. Agitation can be performed by an agitation device that can move the demonstration model in any manner sufficient to at least partially remove the film from the simulated tongue substrate. In one example, the simulated tongue substrate and the liquid can be agitated for about 10 seconds to about 2 minutes, in another example for about 15 seconds to about 90 seconds, and in another example for about 30 seconds to about 60 seconds. In one example, the simulated tongue substrate and the liquid can be agitated for about 60 seconds.

In one example, the simulated tongue substrate and liquid can be agitated until the film is at least partially removed from the simulated tongue substrate and a liquid-film mixture is formed. In one example, agitation completely removes the film from the simulated tongue substrate. In one example, agitation substantially removes the film from the simulated tongue substrate. In one example, agitation partially removes the film from the simulated tongue substrate and a residual film remains on the simulated tongue substrate. In one example, agitation can remove about 90% of the film from the simulated tongue substrate, in another example about 60%, in another example about 30%, and in another example about 10%. The amount of film removed can be determined by comparing the weight of the simulated tongue substrate after the film is applied and after the film is removed by liquid agitation. The simulated tongue substrate can be at least partially covered with film. The simulated tongue substrate can be placed on a scale and the weight of the simulated tongue substrate and film can be measured. The simulated tongue substrate can then be exposed to a liquid and agitated. The simulated tongue substrate can be removed from the liquid and the liquid can be drained from the simulated tongue substrate. The simulated tongue substrate can then be placed on the scale and the weight of the simulated tongue substrate and residual film can be measured.

Viscosity Test Method

The viscosity of the film can be measured using a digital Brookfield Viscometer (model LVDV-E). First, allow the samples and standards to equilibrate at room temperature prior to analysis. Calibrate the viscometer as disclosed in the operator's manual and check the viscosity using a standard. While the sample is at 25° C.±0.5° C., test the sample. For viscosities below 500 cPs, use spindle LV2 at 10 RPM (rotations per minute) and to measure viscosities from 500-1,500 cPs, use spindle LV3 at 10 RPM. Let the spindle turn until the index is providing a stable reading (about 1-2 minutes).

Combinations

A. A method of demonstrating oral bacteria removal, the method comprising: providing a simulated tongue substrate comprising a plurality of projections wherein the plurality of projections are arranged to simulate the surface of a human tongue; applying a film to the surface of the simulated tongue substrate; exposing the simulated tongue substrate to a liquid, in particular wherein the liquid is water; agitating the simulated tongue substrate and the liquid to at least partially remove the film, wherein a liquid-film mixture is formed, in particular agitating the simulated tongue substrate and the liquid for about 15 seconds to about 90 seconds; and optionally recording the application and removal of the film from the surface of the simulated tongue substrate.

B. The method according to paragraph A wherein the film at least partially covers at least about 25% of the total number of projections.

C. The method according to paragraph A or B wherein following the agitation step a residual film remains on the simulated tongue substrate.

D. The method according to one of paragraphs A to C wherein the simulated tongue substrate is partially submerged in the liquid.

E. The method according to one of paragraphs A to D wherein greater than about 50% of the film is removed after agitation in the liquid.

F. The method according to one of paragraphs A to E further comprising the step of brushing the simulated tongue substrate before exposing the simulated tongue substrate to the liquid.

G. The method according to one of paragraphs A to F wherein the simulated tongue substrate comprises a polymer selected from the group consisting of nylon, polycarbonate, polyethylene terephlalate, polystyrene, polyethylene, polyvinylchloride, acrylonitrile butadiene styrene, polypropylene, and combinations thereof.

H. The method according to one of paragraphs A to G wherein the film comprises one or more bacteria simulating components and wherein the one or more bacteria simulating components is selected from the group consisting of whipped cream, starch-based packing peanuts, and combinations thereof.

I. A model system for demonstrating oral bacteria removal comprising: a simulated tongue substrate comprising a base and a plurality of projections wherein the plurality of projections simulate the papillae of a human tongue; a film wherein the film comprises one or more bacteria simulating components; an agitation device, in particular wherein the agitation device is a mechanical agitator; and a recording device.

J. The model system of paragraph I wherein the plurality of projections are structures selected from the group consisting of tines, ribs, domes, and combinations thereof.

K. The model system of paragraph I or paragraph J wherein the simulated tongue substrate comprises about 5 to about 15 projections per square inch of the base.

L. The model system of one of paragraphs I to K further comprising a liquid, wherein the one or more bacteria simulating components is substantially removable in the liquid.

M. A model for demonstrating oral bacteria removal comprising: a simulated tongue substrate; and a film comprising at least one bacteria simulating component; wherein the simulated tongue substrate comprises a base and a plurality of projections, optionally wherein the base defines a plurality of apertures; wherein the plurality of projections are arranged to simulate the surface of a human tongue; wherein the film at least partially covers the plurality of projections, in particular wherein the plurality of projections have an aspect ratio of height to diameter greater than about 1; wherein the film is substantially removable in a liquid.

N. The model of paragraph M wherein the simulated tongue substrate comprises about 5 to about 15 projections per square inch of the base.

O. The model of paragraph M or paragraph N wherein the simulated tongue substrate has a length of about 13 inches and a width of about 10.5 inches.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of demonstrating oral bacteria removal, the method comprising:
   providing a simulated tongue substrate comprising a plurality of projections wherein the plurality of projections are arranged to simulate the surface of a human tongue;
   applying a film to the surface of the simulated tongue substrate;
   exposing the simulated tongue substrate to a liquid;
   agitating the simulated tongue substrate and the liquid to at least partially remove the film, wherein a liquid-film mixture is formed; and
   optionally recording the application and removal of the film from the surface of the simulated tongue substrate.

2. The method of claim 1 wherein the film at least partially covers at least 25% of the total number of projections.

3. The method of claim 1 wherein following the agitation step a residual film remains on the simulated tongue substrate.

4. The method of claim 1 wherein the simulated tongue substrate is partially submerged in the liquid.

5. The method of claim 1 wherein greater than 50% of the film is removed after agitation in the liquid.

6. The method of claim 1 wherein the simulated tongue substrate and the liquid are agitated for 15 seconds to 90 seconds.

7. The method of claim 1 further comprising the step of brushing the simulated tongue substrate before exposing the simulated tongue substrate to the liquid.

8. The method of claim 1 wherein the simulated tongue substrate comprises a polymer selected from the group consisting of nylon, polycarbonate, polyethylene terephlalate, polystyrene, polyethylene, polyvinylchloride, acrylonitrile butadiene styrene, polypropylene, and combinations thereof.

9. The method of claim 1 wherein the liquid is water.

10. The method of claim 1 wherein the film comprises one or more bacteria simulating components and wherein the one or more bacteria simulating components is selected from the group consisting of whipped cream, starch-based packing peanuts, and combinations thereof.

11. A model system for demonstrating oral bacteria removal comprising:
    a simulated tongue substrate comprising a base and a plurality of projections wherein the plurality of projections simulate the papillae of a human tongue;
    a film wherein the film comprises one or more bacteria simulating components;
    an agitation device; and
    a recording device.

12. The model system of claim 11 wherein the plurality of projections are structures selected from the group consisting of tines, ribs, domes, and combinations thereof.

13. The model system of claim 11 wherein the simulated tongue substrate comprises 5 to 15 projections per square inch of the base.

14. The model system of claim 11 further comprising a liquid, wherein the one or more bacteria simulating components is substantially removable in the liquid.

15. A model for demonstrating oral bacteria removal comprising:
    a simulated tongue substrate; and
    a film comprising at least one bacteria simulating component;
    wherein the simulated tongue substrate comprises a base and a plurality of projections;
    wherein the plurality of projections are arranged to simulate the surface of a human tongue;

wherein the film at least partially covers the plurality of projections;

wherein the film is substantially removable in a liquid.

16. The model of claim 15 wherein the simulated tongue substrate comprises 5 to 15 projections per square inch of the base.

17. The model of claim 15 wherein the plurality of projections have an aspect ratio of height to diameter greater than 1.

18. The model of claim 15 wherein the simulated tongue substrate has a length of 13 inches and a width of 10.5 inches.

19. The model of claim 15 wherein the base defines a plurality of apertures.

\* \* \* \* \*